(12) United States Patent
Lee

(10) Patent No.: US 10,636,156 B2
(45) Date of Patent: *Apr. 28, 2020

(54) APPARATUS AND METHOD FOR ANALYZING THREE-DIMENSIONAL INFORMATION OF IMAGE BASED ON SINGLE CAMERA AND COMPUTER-READABLE MEDIUM STORING PROGRAM FOR ANALYZING THREE-DIMENSIONAL INFORMATION OF IMAGE

(71) Applicant: DEEPIXEL INC., Seoul (KR)

(72) Inventor: Jehoon Lee, Seoul (KR)

(73) Assignee: DEEPIXEL INC., Seoul (KR)

( * ) Notice: Subject to any disclaimer, the term of this patent is extended or adjusted under 35 U.S.C. 154(b) by 8 days.

This patent is subject to a terminal disclaimer.

(21) Appl. No.: 15/737,108

(22) PCT Filed: Sep. 12, 2016

(86) PCT No.: PCT/KR2016/010273
§ 371 (c)(1),
(2) Date: Dec. 15, 2017

(87) PCT Pub. No.: WO2018/048000
PCT Pub. Date: Mar. 15, 2018

(65) Prior Publication Data
US 2018/0365848 A1 Dec. 20, 2018

(51) Int. Cl.
*G06T 7/536* (2017.01)
*G06F 3/0482* (2013.01)
(Continued)

(52) U.S. Cl.
CPC .............. *G06T 7/536* (2017.01); *G06F 3/011* (2013.01); *G06F 3/013* (2013.01); *G06F 3/017* (2013.01);
(Continued)

(58) Field of Classification Search
CPC . G06T 7/536; G06T 7/251; G06T 7/11; G06T 7/246; G06T 7/73; G06T 7/579;
(Continued)

(56) References Cited

U.S. PATENT DOCUMENTS

2011/0129124 A1* 6/2011 Givon .................... G06F 3/011
382/107
2015/0161437 A1 6/2015 Mazurenko et al.
(Continued)

FOREIGN PATENT DOCUMENTS

KR 10-2006-0019273 A 3/2006
KR 10-2012-0071230 A 7/2012
(Continued)

*Primary Examiner* — John W Lee
(74) *Attorney, Agent, or Firm* — Novick, Kim & Lee, PLLC; Sang Ho Lee

(57) ABSTRACT

A method for analyzing a three-dimensional (3D) information of an image based on a single camera according to an embodiment of the present disclosure is provided to. The method includes storing an image obtained by the single camera on a frame-by-frame basis, determining a plurality of feature points configuring a hand shape included in the stored image and extracting a region of interest (ROI) based on the feature points, tracking a change in a two-dimensional (2D) length component configured with feature points of the ROI during a predetermined time interval, analyzing a change in 3D coordinates of the feature points based on the change in the 2D length component and deriving a motion vector of the feature points during the predetermined time interval based on the analysis, and determining an operation indicated by a hand shape based on the derived motion vector.

17 Claims, 5 Drawing Sheets

(51) Int. Cl.

| | |
|---|---|
| *G06F 3/0484* | (2013.01) |
| *G06T 7/579* | (2017.01) |
| *G06T 7/11* | (2017.01) |
| *G06T 7/246* | (2017.01) |
| *G06T 7/73* | (2017.01) |
| *G06F 3/01* | (2006.01) |
| *G06F 3/0481* | (2013.01) |
| *G06K 9/00* | (2006.01) |
| *G06K 9/46* | (2006.01) |

(52) U.S. Cl.
CPC ........ *G06F 3/0482* (2013.01); *G06F 3/04815* (2013.01); *G06F 3/04842* (2013.01); *G06K 9/00355* (2013.01); *G06K 9/00375* (2013.01); *G06K 9/4604* (2013.01); *G06T 7/11* (2017.01); *G06T 7/246* (2017.01); *G06T 7/251* (2017.01); *G06T 7/579* (2017.01); *G06T 7/73* (2017.01); *G06F 3/012* (2013.01); *G06T 2207/30196* (2013.01)

(58) Field of Classification Search
CPC ....... G06T 2207/30196; G06F 3/04842; G06F 3/0482; G06F 3/011; G06F 3/013; G06F 3/017; G06F 3/04815; G06F 3/012; G06K 9/4604; G06K 9/00375; G06K 9/00355
See application file for complete search history.

(56) References Cited

U.S. PATENT DOCUMENTS

| | | | |
|---|---|---|---|
| 2015/0253864 A1* | 9/2015 | Parkhomenko | G06F 3/017 345/156 |
| 2015/0378444 A1 | 12/2015 | Yin et al. | |
| 2017/0140552 A1* | 5/2017 | Woo | G06F 1/163 |

FOREIGN PATENT DOCUMENTS

| | | |
|---|---|---|
| KR | 10-1171239 B | 8/2012 |
| KR | 10-2016-0000873 A | 1/2016 |

* cited by examiner

APPARATUS AND METHOD FOR ANALYZING THREE-DIMENSIONAL INFORMATION OF IMAGE BASED ON SINGLE CAMERA AND COMPUTER-READABLE MEDIUM STORING PROGRAM FOR ANALYZING THREE-DIMENSIONAL INFORMATION OF IMAGE

TECHNICAL FIELD

The present disclosure relates to a method for estimating a location of a finger of a user based on a single camera, a storage medium storing a program for executing such a method, and an apparatus for analyzing a three-dimensional (3D) information of an image based on the single camera.

BACKGROUND ART

To obtain 3D depth information in image processing, image information may be obtained using a device, such as a structured light, a stereo camera, an infra-red camera, or an infra-red laser, and an image may be three-dimensionally restored to obtain 3D location information in the image.

Meanwhile, there is a method in which a user wears an input glove on his or her hand or attaches a 3D marker to part of his or her body to obtain 3D location information.

A method for constituting a system which has two different fields of view using an image obtained by an infra-red camera and an image obtained from an image reflected from a mirror in a device including a single camera and the mirror to obtain 3D location information is proposed as well as this method.

Meanwhile, there is a need for separate equipment to obtain 3D location information in such methods. Calculation processing for images may be complex, and loads may occur in the processing.

DETAILED DESCRIPTION OF THE INVENTION

Technical Problem

An aspect of the present disclosure is to provide a method for analyzing a 3D information of an image based on a single camera to three-dimensionally estimate a location of a finger of a user and a change in location and providing an interface through such location estimation, a medium for storing a program for analyzing a 3D information of an image, and an apparatus for analyzing a 3D information of an image.

Technical Solution

In accordance with an aspect of the present disclosure, a method for estimating a location of a finger based on a single camera is provided. The method may include storing an image obtained by the single camera on a frame-by-frame basis, determining a plurality of feature points configuring a hand shape included in the stored image and extracting a region of interest (ROI) based on the feature points, tracking a change in a two-dimensional (2D) length component configured with feature points of the ROI during a predetermined time interval, and analyzing a change in 3D coordinates of the feature points based on the change in the 2D length component and deriving a motion vector of the feature points during the predetermined time interval based on the analysis.

In an embodiment, the extracting of the ROI may include determining finger feature points of ends of two adjacent fingers of the hand shape and a palm feature point of a palm boundary between the two fingers, setting a virtual feature point configuring a quadrangular region with the finger feature points, and extracting the quadrangular region configured with the virtual feature point and the finger feature points as the ROI. For example, the tracking of the change in the 2D length component may include tracking a change in two length components configured with the finger feature points and the palm feature point.

In an embodiment, the tracking of the change in the 2D length component may include completing a hand shape skeleton corresponding to the 2D length component based on a skeleton model and, if at least one of the two length components is not defined in an image of a specified frame unit, defining the 2D length component based on the completed hand shape skeleton.

In an embodiment, the tracking of the change in the 2D length component may include tracking a change in an angle between the two length components or movement of a location of each of the two length components.

In an embodiment, the deriving of the motion vector may include estimating a change in a coordinate of a depth direction (z-axis) for the finger feature points based on a change in at least one of the two length components and analyzing a change in 3D coordinates for the feature points based on at least one of the estimated change in the coordinate of the depth direction, the change in the angle, and the movement of the location and deriving the motion vector. For example, the method may further include estimating a change in rotation around a central axis of the hand shape skeleton based on the change in the coordinate of the depth direction.

According to an embodiment, the method may further include determining an operation indicated by the hand shape based on the derived motion vector.

According to an embodiment, the method may further include deriving a command matched to the operation indicated by the hand shape and executing the derived command.

In accordance with another aspect of the present disclosure, a computer-readable storage medium storing a program for performing at least one of the above-mentioned methods for analyzing the 3D image may be included in the spirit and scope of the present disclosure.

In accordance with another aspect of the present disclosure, an apparatus for analyzing a 3D image based on a signal camera is provided. The apparatus may include an image obtaining unit configured to store an image obtained by the single camera on a frame-by-frame basis, an image extracting unit configured to determine a plurality of feature points configuring a hand shape included in the stored image and extract an ROI based on the feature points, an image tracking unit configured to track a change in a 2D length component configured with feature points of the ROI during a predetermined time interval, and an image analyzing unit configured to analyze a change in 3D coordinates of the feature points based on the change in the 2D length component and derive a motion vector of the feature points during the predetermined time interval based on the analysis.

In an embodiment, the image extracting unit may determine finger feature points of ends of two adjacent fingers of the hand shape and a palm feature point of a palm boundary between the two fingers and may extract the ROI of a quadrangular region configured with the feature points.

In an embodiment, the image obtaining unit may provide a hand shape guide for an initial input of a user on a display.

In an embodiment, the image tracking unit may complete a hand shape skeleton corresponding to the two length components configured with the finger feature points and the palm feature point, based on a skeleton model and may track a change in the two length components based on the completed hand shape skeleton.

In an embodiment, if at least one of the two length components is not defined in an image of a frame unit at a specific time, the image tracking unit may estimate the 2D length component based on the hand shape skeleton.

In an embodiment, the image tracking unit may track a change in an angle between the two length components or movement of a location of each of the two length components.

In an embodiment, the image analyzing unit may estimate a change in a coordinate of a depth direction (z-axis) for the finger feature points based on a change in at least one of the two length components, may analyze a change in 3D coordinates for the feature points based on at least one of the estimated change in the coordinate of the depth direction, the change in the angle, and the movement of the location, and may derive the motion vector.

In an embodiment, the image analyzing unit may determine an operation indicated by the hand shape based on the derived motion vector.

Advantageous Effects of the Invention

Various embodiments disclosed in the present disclosure may analyze an image obtained by a single camera and may ascertain 3D location information of a finger including depth information. Therefore, various embodiments may reduce complexity of calculation for analyzing a 3D image by analyzing the 3D image based on an image obtained by the single camera without separate equipment.

Various embodiments disclosed in the present disclosure are for examples. Those skilled in the art will appreciate that various modifications, alternatives, and additions are possible through the spirit and scope of the attached claims. It is understood that such modifications and the like belong to the accompanying claims.

BEST MODE

Hereinafter, various embodiments of the present disclosure may be described in detail with reference to the accompanying drawings. The same denotations refer to the same elements on drawings in the specification, and a description by the same elements may be omitted.

The specific structural or functional description is merely illustrative for the purpose of describing embodiments of the present disclosure with respect to various embodiments of the present disclosure disclosed herein. Various embodiments of the present disclosure may be implemented in various forms, and may not be construed as limited to the embodiments set forth herein.

Expressions such as "$1^{st}$", "$2^{nd}$" "first" and "second" used in various embodiments may be used to refer to various elements regardless of the order and/or the priority, but the above elements should not be restricted to the above expressions. For instance, the first element may be named the second element, and vice versa, without departing the scope of claims of the present disclosure.

The terms used in the specification are intended to describe certain embodiments only, and should by no means restrict the scope of another embodiment. Unless clearly used otherwise, expressions in a singular form include a meaning of a plural form.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in the present disclosure, they may not be interpreted to exclude embodiments of the present disclosure.

Figure 1:
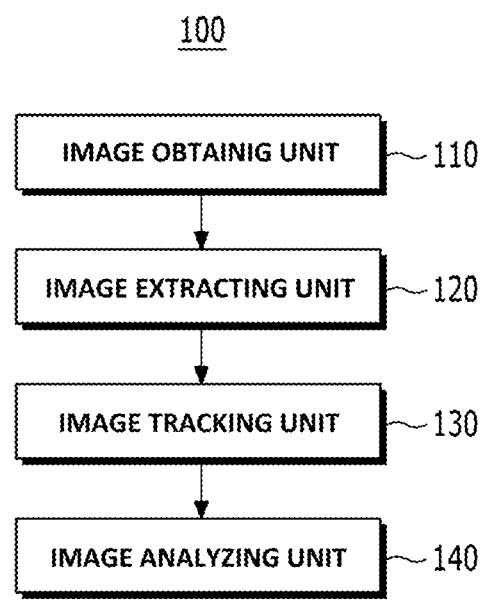
FIG. 1 is a block diagram illustrating a 3D image analyzing device according to embodiments of the present disclosure.
Figure 2:
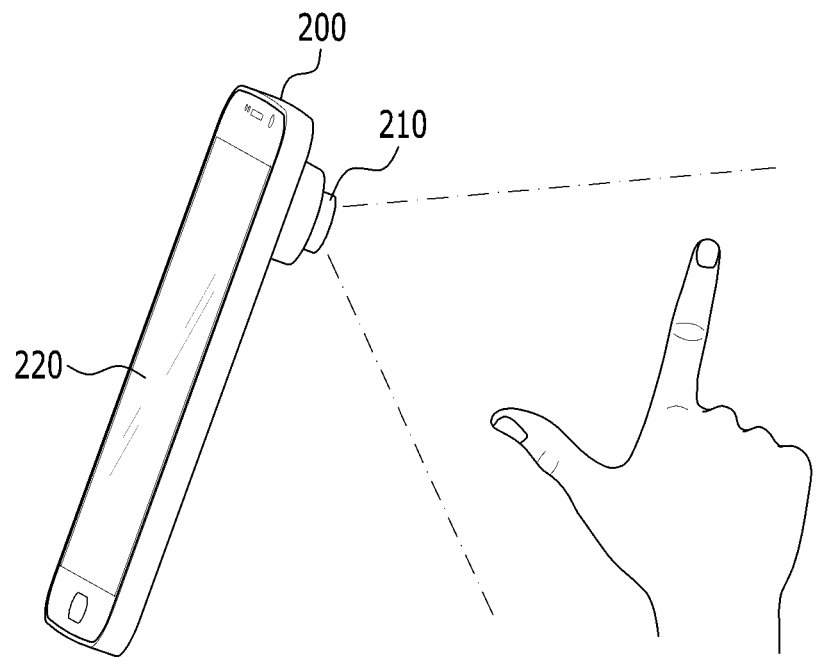
FIG. 2 is a drawing illustrating obtaining an image using a 3D image analyzing device according to an embodiment of the present disclosure.
Figure 3:
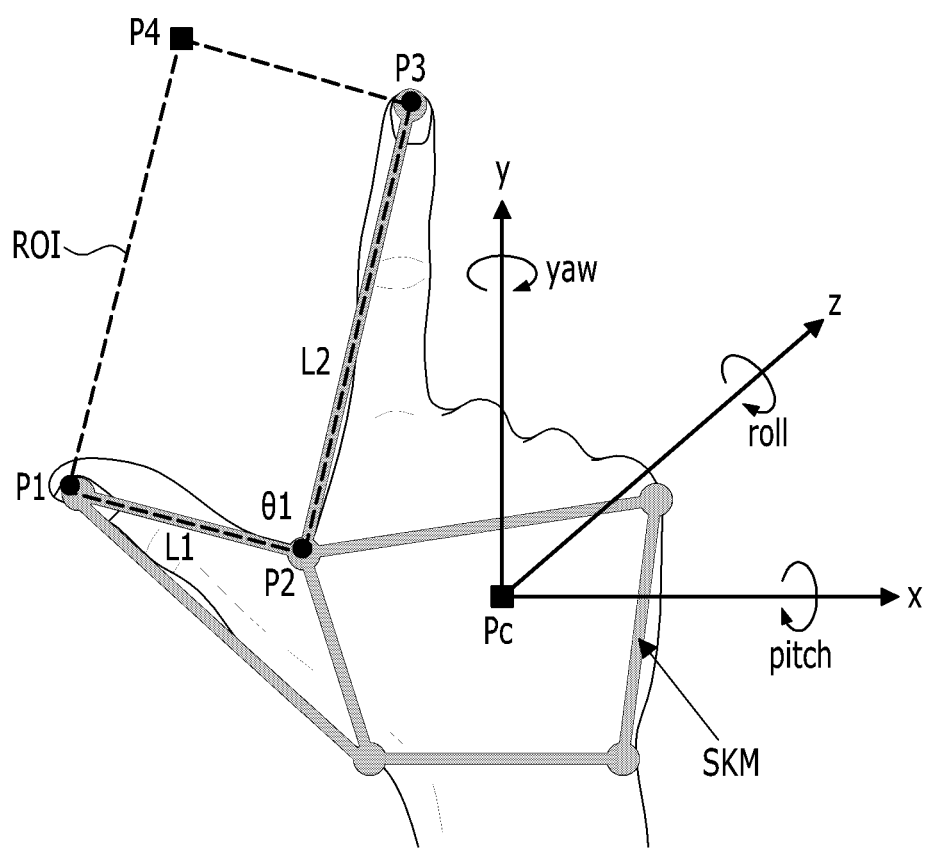
FIG. 3 is a drawing illustrating an operation of a 3D image analyzing device according to an embodiment of the present disclosure.

FIG. 1 is a block diagram illustrating a 3D image analyzing device according to an embodiment of the present disclosure. FIG. 2 is a drawing illustrating an usage example of a 3D image analyzing device according to an embodiment of the present disclosure. FIG. 3 is a drawing illustrating analyzing an obtained image according to an embodiment of the present disclosure. Hereinafter, a description will be given of an operation of an image analysis device according to an embodiment of the present disclosure with reference to FIGS. 1 to 3.

Referring to FIG. 1, a 3D image analyzing device 100 may include an image obtaining unit 110, an image extracting unit 120, an image tracking unit 130, and an image analyzing unit 140.

The image obtaining unit 110 may obtain consecutive images on a frame-by-frame basis using an image obtaining means such as a camera. For example, the image obtaining unit 110 may obtain a moving image during a predetermined time in real time and may store the obtained image on a frame-by-frame basis in a storage means such as a cache.

The 3D image analyzing device 100 according to an embodiment of the present disclosure may estimate a change in 3D coordinates of an image based on the image obtained from a single gaze by a single camera. According to an embodiment, the image obtaining unit 110 may include an image obtaining means for obtaining an image.

The image extracting unit 120 may extract only a region of interest (ROI) which should be processed in the image of a frame unit, obtained from the image obtaining unit 110. According to an embodiment, the image extracting unit 120 may determine a plurality of feature points from a hand shape included in the image of the frame unit and may extract the ROI based on the determined feature points. The ROI in the specification may be called an image region necessary for determining a feature point from the obtained image and analyzing a change in location during a predetermined time interval. The image extracting unit 120 may extract the ROI from the image of the frame unit, obtained by the image obtaining unit 110.

In the present disclosure, the image extracting unit 120 may specify a feature point depending on various feature point determination schemes and may extract an ROI in different manners from one image of a frame unit.

In the specification, an embodiment is exemplified as the obtained image includes the hand shape. However, embodiments are not limited thereto. For example, the image extracting unit 120 may recognize a finger and a palm in the hand shape included in the obtained image and may determine finger feature points of ends of two fingers and a palm feature point of a palm boundary between the two fingers, thus extracting a quadrangular region configured with the feature points as an ROI.

Referring to FIG. 3, the image extracting unit 120 may determine ends of a thumb and an index finger in a hand shape as finger feature points P1 and P3 and may determine a palm feature point P2 of a palm boundary between the two fingers.

According to an embodiment, the image extracting unit 120 may set a virtual feature point P4 for configuring a quadrangular region including the finger feature points P1 and P3 and the palm feature point P2. The image extracting unit 120 may set the virtual feature point P4 for configuring a quadrangular region together with the three feature points P1 to P3 and may extract the quadrangular region formed by the feature points P1 to P4 as an ROI.

An image segmentation algorithm and a feature extraction algorithm which are image processing algorithms may be performed together in the image extracting unit 312 to obtain an ROI. The image extracting unit 120 may convert an image obtained for image segmentation and feature extraction into another color channel or may remove a noise using an image filtering technique. Alternatively, the image extracting unit 120 may perform image pre-processing such as image normalization of an obtained image.

According to an embodiment, the image extracting unit 120 may define an observation model. For example, the image extracting unit 120 may perform modeling using a characteristic in which a nail portion and a finger portion generally have different colors or may perform modeling by previously registering a skin color of a user and learning a subtle change in the skin color by illumination whenever an image analysis is performed.

According to an embodiment, the image extracting unit 120 may update a feature value of a region around a finger, changed every frame, to a tracking model in real time. The image extracting unit 120 may more accurately determine a feature point depending on the definition of observation model.

The image tracking unit 130 may track a change in length components configured with finger feature points and a palm feature point. According to an embodiment, the image tracking unit 130 may track a change in two length components between feature points of two fingers and a palm feature point between the two fingers.

Referring to FIG. 3, the image tracking unit 130 may track a change in a first length component L1 between the first finger feature point P1 of an end of a thumb and the palm feature point P2 and a change in a second length component L2 between the second finger feature point P3 of an end of an index finger and the palm feature point P2.

According to an embodiment, the image tracking unit 130 may complete a hand shape skeleton SKM corresponding to the length components L1 and L2 based on a skeleton model. Referring to FIG. 3, the image tracking unit 130 may complete the hand shape skeleton SKM corresponding to the two length components L1 and L2 and may set a center Pc of the hand shape based on the hand shape skeleton SKM.

As the hand shape skeleton SKM is completed, if a specific length component is not completely defined during a predetermined time interval, for example, if an image for a finger end is not obtained in a specific frame unit, the image tracking unit 130 may define a length component based on the hand shape skeleton SKM. In other words, the image tracking unit 130 may estimate a location of an end of a finger. In the present disclosure, the image tracking unit 130 may apply a tracking algorithm and skeleton modeling to facilitate robust location tracking. The tracking algorithm may be configured by combining Kalman filters and particle filters based on Bayesian with a mean-shift algorithm for repeatedly estimating a mode of a probability density function of an image.

The image tracking unit 130 may track movement of a location of each of the two length components L1 and L2 and a change in a length of each of the two length components L1 and L2.

According to an embodiment, the image tracking unit 130 may set an angle θ1 between the two length components L1 and L2 and may track a change in the angle θ1.

The image analyzing unit 140 may analyze a change in 3D coordinates of at least one of the feature points P1 to P4 based on a change in each of the 2D length components L1 and L2. For example, the change in each of the 2D length components L1 and L2 may be a change in location or a change in length. The change in each of the two length components L1 and L2 may be an independent change or a relative change.

The image analyzing unit 140 may derive a motion vector of at least one of the feature points P1 to P4 during a predetermined time interval based on the analysis result.

According to an embodiment, the image analyzing unit 140 may analyze a change in 3D coordinates of feature points relative to Table 1.

TABLE 1

| Case | Change in length component | | Change in coordinate of depth direction | |
|------|-------------------|-------------------|----------|----------|
|      | L1 | L2 | P1 | P3 |
| 1 | Decrease in length | Decrease in length | Increase | Increase |
| 2 | Increase in length | Increase in length | Decrease | Decrease |
| 3 | No change | Decrease in length | No change | Increase |
| 4 | No change | Increase in length | No change | Decrease |
| 5 | Decrease in length | No change | Increase | No change |
| 6 | Increase in length | No change | Decrease | No change |
| 7 | No change | No change | No change | No change |

In the first case, both of the first length component L1 and the second length component L2 may decrease. In this case, since it is determined that two fingers are equally distant from an image obtaining means, it may be determined that the first feature point P1 and the third feature point P3 increases in a coordinate of a depth direction. In the specification, an embodiment is exemplified as being distant from the image obtaining means is represented as a coordinate of a depth direction increases. However, embodiments are not limited thereto.

On the other hand, in the second case, both of the first length component L1 and the second length component L2 may increase. Since it is determined that both of two fingers are close toward the image obtaining means, it may be determined that the first feature point P1 and the third feature point P3 may decrease in a coordinate of a depth direction.

Figure 6:
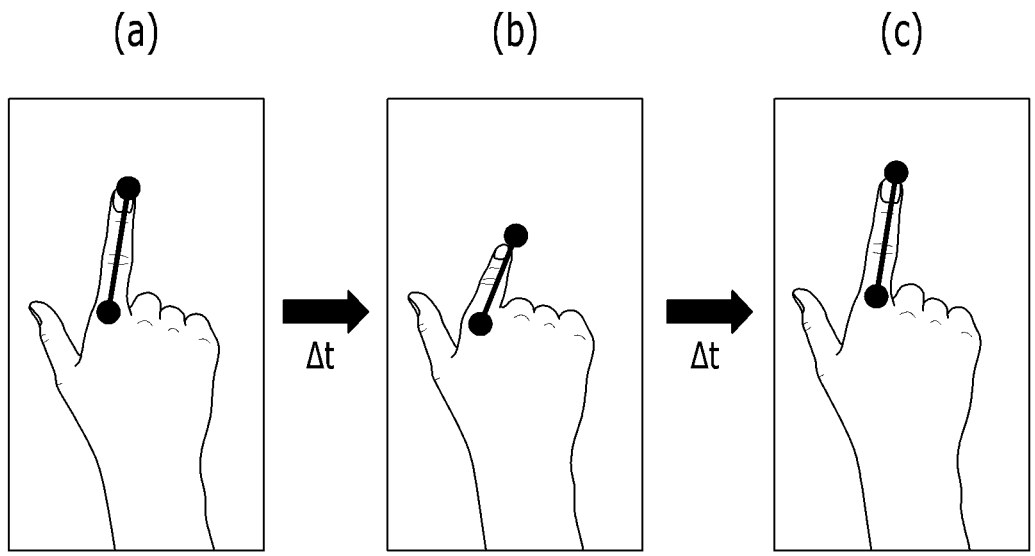

In the third case and the fourth case, there may be no change in a length of the first length component L1 and only the second length component L2 may decrease and increase in length, respectively. In the cases, since there is no change in the first length component L1, assuming that the entire hand is not moved, an operation in which the second length component L2 decreases may be analyzed as an operation in which an index finger faces the bottom. A description will be given of the operation with reference to FIGS. 6A to 6C.

Referring to FIG. 6A, if the second length component L2 with the longest length is observed, an index finger may face a front surface with respect to an image obtaining means. In such a state, if the index finger moves to the bottom toward a palm from the back of a user's hand as shown in FIG. 6B, the second length component L2 facing the front surface may relatively decrease in length. Thus, the third feature point P3 may increase in a coordinate of a depth direction during a time interval from FIG. 6A to FIG. 6B (case 3).

On the other hand, if the index finger moves to raise a finger from a state of FIG. 6B to a state of FIG. 6C and face the front surface of the image obtaining means again, the second length component L2 may gradually increase. Thus, the third feature point P3 may decrease in a coordinate of a depth direction during a time interval from FIG. 6B to FIG. 6C (case 4).

As such, the image analyzing device 100 according to an embodiment of the present disclosure may view a change in the 2D length components L1 and L2 during a predetermined time interval and may analyze a change in 3D coordinates of the feature points P1 and P3. Further, in the third case, a vector composed of the third feature point P3 may be derived as a vector distant from the image obtaining means, and, in the fourth case, the vector composed of the third feature point P3 may be derived as a vector facing the image obtaining means, according to the analysis of the change in the coordinate.

In the fifth case and the sixth case, there may be no change in a length of the second length component L2 and only a first length component L1 may decrease and increase in length, respectively. Similar to the third and fourth cases, in the fifth and sixth cases, since there is no change in the second length change L2, it may be determined assuming that the entire hand is not moved.

An operation in which the first length component L1 decreases in the fifth case may be analyzed as an operation in which the longest observed thumb toward a front surface gradually decreases in length toward the bottom.

On the other hand, an operation in which the reduced first length component L1 gradually increases in the sixth case may be analyzed as an operation in which the thumb facing the bottom becomes longer and longer in length while moving to the top again.

Thus, the image analyzing unit 140 may analyze that the first feature point P1 increases in a coordinate of a depth direction in the fifth case and may analyze that the first feature point P1 decreases in the coordinate of the depth direction in the sixth case.

The image analyzing unit 140 may derive a vector composed of the first feature point P1 as a vector distant from the image obtaining means in the fifth case and may derive a vector composed of the first feature point P1 as a vector toward the image obtaining means in the sixth case, based on the analysis of the change in coordinate.

In the seventh case, there may be no change in the first and second length components L1 and L2. In this case, movement of a depth direction may be analyzed as a hand shape moves a 2D plane or as an angle between the first and second length components L1 and L2 is changed.

Figure 7:
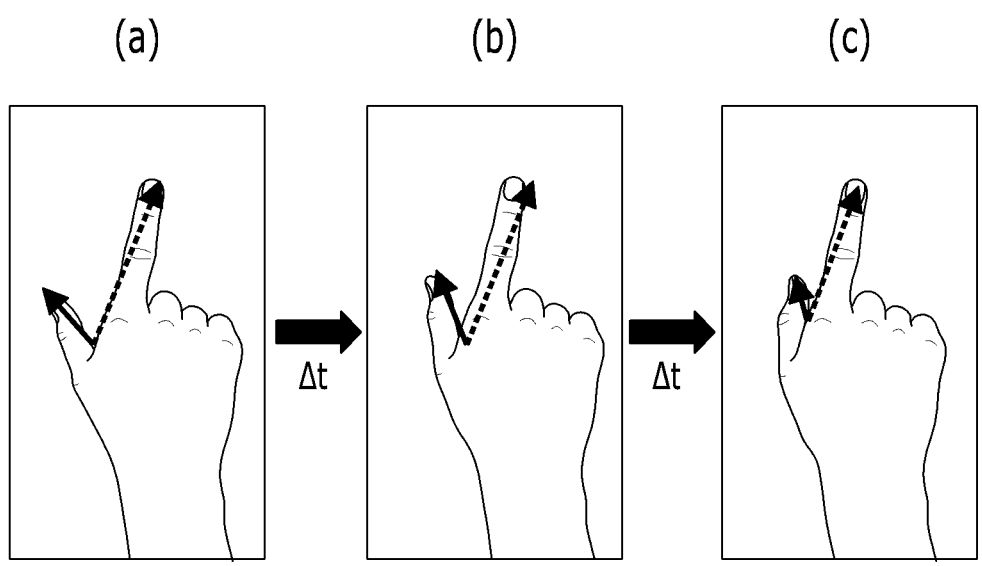

Referring to FIGS. 7A to 7C, an operation in which there is no change in a length of each of the first length component L1 and the second length component L2 and in which an angle θ between the first length component L1 and the second length component L2 is changed may be verified. In this case, a vector of the first feature point P1 may be converted into a motion vector facing a right upper end.

According to an embodiment, the image analyzing unit 140 may estimate a change in rotation around a central axis of a hand shape skeleton based on a change in a coordinate of a depth direction.

Referring to FIG. 3, a 3D virtual axis may be set for a center Pc of a hand shape. Rotation of each axis may be called a pitch, a yaw, or a roll. Herein, the virtual axis may be relative to the center Pc of the hand shape, and a term which calls an axis may vary.

In each case described with reference to Table 1, the third case and the fourth case may be analyzed as a case where a hand rotates around an x-axis of FIG. 3.

Further, the fifth case and the sixth case may be analyzed as a case where the hand rotates around a y-axis of FIG. 3.

Finally, although both of the first length component L1 and the second length component L2 are not changed in length in the seventh case, the seventh case may be analyzed as a case where the hand rotates around a z-axis.

The image analyzing unit 140 may analyze an operation of a change in rotation around a virtual axis of the center Pc of the hand shape based on a change in the first length component L1 and the second length component L2.

Since an operation of a change in rotation or an operation during a predetermined time interval is changed, the image analyzing unit 140 may convert a location of each feature point and a change in each feature point into a motion vector based on a result of analysis.

The image analyzing unit 140 may convert an operation indicated by a specific pattern into an input signal based on a motion pattern of a hand shape. For example, the image analyzing unit 140 may implement a 3D interface, such as a mouth, which provides 2D basic interaction based on the motion pattern of the hand shape.

Further, according to an embodiment, the image analyzing unit 140 may match and manage a specific command with a motion pattern of a specific hand shape depending on an input of a user. The image analyzing unit 140 may derive commands matched to a motion vector stored in a volatile memory and/or a non-volatile memory and may execute the commands. The image analyzing unit 140 may have a storage space and may manage a motion vector matched with a command stored in the storage space, or may derive a command matched with a motion vector from an external storage space.

For example, performing an operation of drawing a quadrangle with a finger may be defined as providing an operation command to open a specific window. Alternatively, continuing moving a finger in a direction distant from the image obtaining means, that is, a depth direction may be defined as providing a command to decrease the window.

According to an embodiment, the image analyzing unit 140 may derive a matched command based on each of motion vectors of the first and third feature points P1 and P3 determined based on a change in the two length components L1 and L2 or a combination thereof.

Referring to FIG. 2, a 3D image analysis device according to an embodiment of the present disclosure may be included in hardware such as a device 200 having a physical body. The device 200 may include an image obtaining means 210 and a display 220. Further, although not illustrated, a computer-readable medium may be included in the device 200 and may store a program for performing a 3D analysis method described in the specification. A central processing unit (CPU) for executing the 3D analysis method according to an embodiment of the present disclosure may be included in the device 200.

In another embodiment, the device 200 may obtain an image through the image obtaining means 210 and may store the obtained image on a frame-by-frame basis. However, an image processing operation of extracting an ROI of such an image, tracking a change in 2D length component, or deriving a motion vector may be performed by another device connected through various communication modes, for example, a server.

The device 200 may receive an image result processed by the server and may transmit the received image result to a user through the display 220.

In FIG. 2, an embodiment is exemplified as the device 200 is a portable device the user carries with his or her hand. However, the device 200 is not limited thereto. For example, the device 200 may include all of devices, each having a means which may display an image on the display 220 in the form of having the image obtaining means 210, obtaining an image of a hand shape, and allowing the user to verify a figure of the obtained image. According to an embodiment, the device 200 may include a virtual reality (VR) goggle or a head gear.

Figure 4:
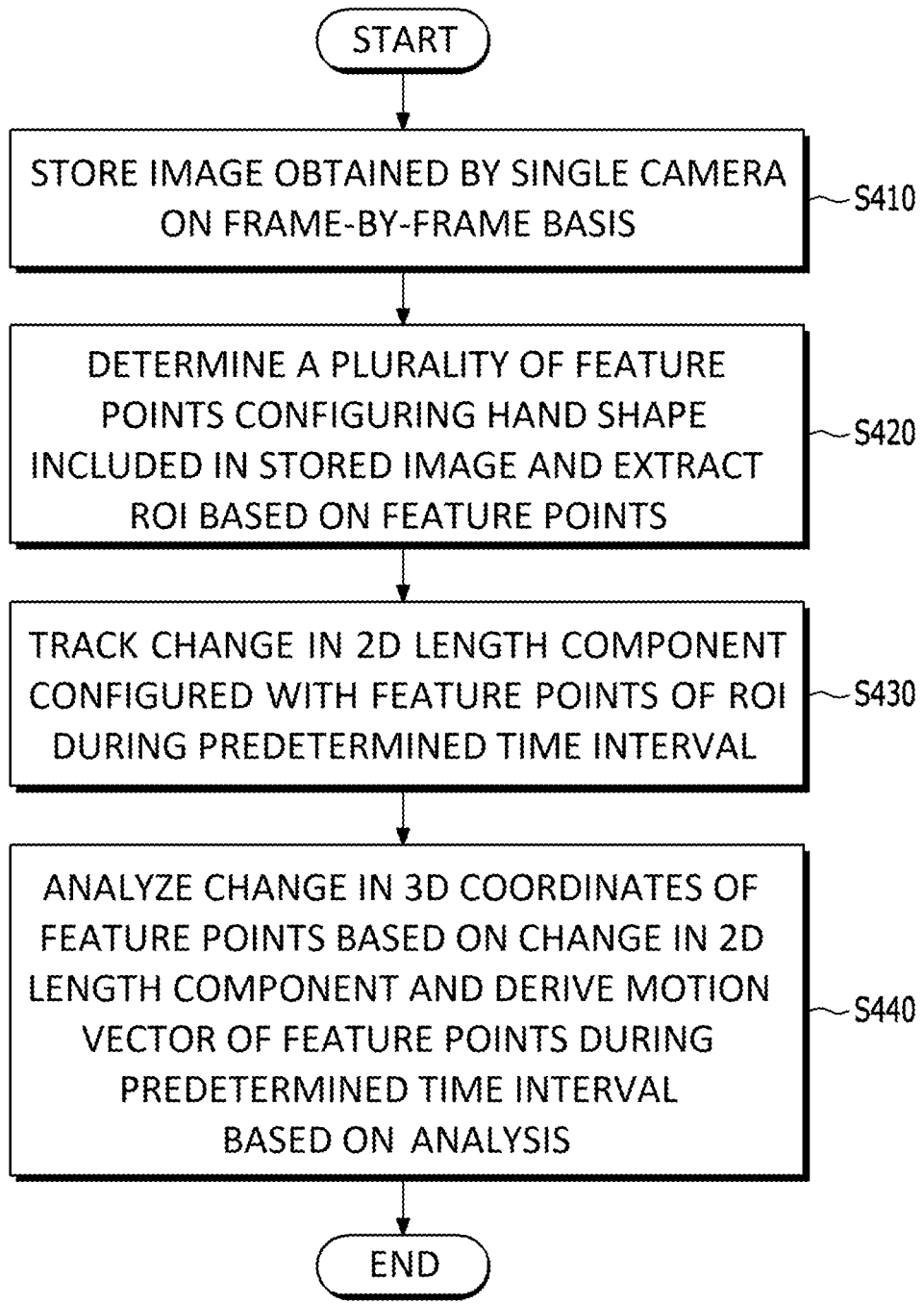
FIG. 4 is a flowchart illustrating a 3D image analyzing method according to an embodiment of the present disclosure.

FIG. 4 is a flowchart illustrating a 3D image analyzing method according to an embodiment of the present disclosure.

Referring to FIG. 4, in step S410, the image obtaining unit 110 of a 3D image analyzing device 100 may store an image obtained by a single camera on a frame-by-frame basis.

Receiving the image obtained by the image obtaining unit 110, in step S420, an image extracting unit 120 may determine a plurality of feature points configuring a hand shape included in the stored image and may extract an ROI based on the determined feature points.

Figure 5:
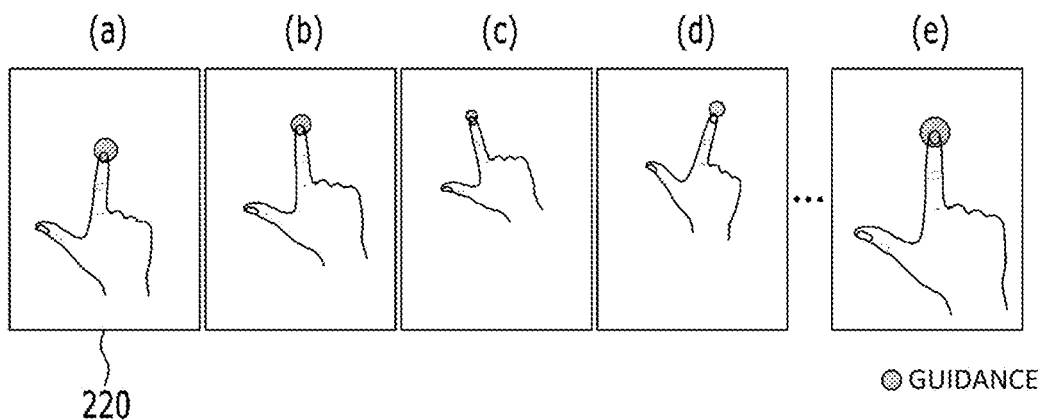
FIGS. 5-7 are drawings illustrating various hand operations for describing a 3D image analysis according to embodiments of the present disclosure.

According to an embodiment, the image obtaining unit 110 may provide a hand shape guide for naturally guiding a user to enter an initial input of the user on a display (e.g., a display 220 of FIG. 2). As shown in FIG. 5A, if a point for an initial input is displayed, the user may match his or her finger end to the point to perform an operation.

According to an embodiment, an initial guide may be displayed. As verified in FIGS. 5A to 5E, all of traces of recognized feature points may be displayed on the display. In this case, the point may be differently displayed in size to represent an increase and decrease in a coordinate of a depth direction. Displaying an initial guide may be performed by the imaging obtaining unit 110. However, tracking an operation of the user and displaying an increase and decrease in a coordinate of a depth direction as an analyzed result may be performed by an image tracking unit 130 or an image analyzing unit 140.

According to an embodiment, a location of a hand shape image obtained on an initial guide screen may be defined as a reference origin point of coordinates of a feature point.

The image obtaining unit 110 may have a separate storage means and may minimize a calculation load for image processing by extracting an ROI at the image extracting unit 120. As described above, the ROI may correspond to a quadrangular region configured with finger feature points P1 and P3 of FIG. 3 of ends of two adjacent fingers of a hand shape and a palm feature point P2 of FIG. 3 of a palm boundary between the two fingers.

According to an embodiment, the image extracting unit 120 may perform a step of determining finger feature points and a palm feature point and setting a virtual feature point P4 of FIG. 3 which configures a quadrangle with the finger feature points and the palm feature point.

In step S430, the image tracking unit 130 may track a change in a 2D length component configured with feature points of an ROI during a predetermined time interval. According to an embodiment, the image tracking unit 130 may track a change in a first length component L1 configured with the first finger feature point P1 and the palm feature point P2 and may track a change in a second length component L2 configured with the third finger feature point P3 and the palm feature point P2.

According to an embodiment, the image tracking unit 130 may complete a hand shape skeleton (SKM of FIG. 3) corresponding to a length component based on a skeleton model. If the first length component L1 or the second length component L2 is not defined in an image of a specific frame unit due to using the hand shape skeleton SKM, the image tracking unit 130 may estimate a location of each of the finger feature points P1 and P3 and may define a length component.

According to an embodiment, the image tracking unit 130 may track a change in an angle θ1 between the two length components L1 and L2 or movement of a location of each of the two length components L1 and L2.

In step S440, the image analyzing unit 140 may analyze a change in 3D coordinates of feature points based on a change in 2D length components and may derive a motion vector of feature points during a predetermined time interval based on such an analysis.

As shown in Table 1, the image analyzing unit 140 may estimate a change in a coordinate of a depth direction for the finger feature points P1 and P3 based on a change in a length of at least one of the length components L1 and L2. According to an embodiment, the image analyzing unit 140 may estimate a change in rotation around a virtual axis of a center Pc of a hand shape based on a change in a length of at least one of the length components L1 and L2.

The image analyzing unit 314 may derive a motion vector of the feature points P1 and P3 during a predetermined time interval based on the analyzed result.

According to an embodiment, the image analyzing unit 140 may determine a 3D change direction of the hand shape, that is, a motion pattern based on at least one of a motion vector, a change in rotation around a central axis of the hand shape, and an angle θ.

The image analyzing unit 140 may determine an operation indicated by the hand shape based on a motion vector and may derive a command matched to the determined operation, thus executing the derived command.

The image analyzing unit 140 may manage a matched command with respect to a specific motion vector.

FIGS. 5A to 7C are drawings illustrating embodiments of various hand shapes changed during a predetermined time interval for describing a 3D image analysis method according to an embodiment of the present disclosure.

Referring to FIGS. 5A to 5E, a guide may continue being displayed on an end of an index finger. A user may recognize whether his or her operation is analyzed as any motion vector and whether to perform any command as a result, through displaying such a guide on a display.

An operation shown in FIGS. 5A to 5E may be determined as an operation where an index finger continues moving. Further, the operation shown in FIGS. 5A to 5E may be analyzed as an operation where a hand shape is distant and close since the index finger continues moving and since the index finger continues decreasing and increasing in length while a length rate between two components of a longitudinal direction is maintained. It may be displayed as the guide increases and decreases in size depending on the result of determining a coordinate of a depth direction.

An operation shown in FIGS. 6A to 6C may be an operation where a second length component L2 of an end of the index finger decreases in length during a time interval from FIG. 6A to FIG. 6B and increases again during a time interval from FIG. 6B to FIG. 6C. According to an embodiment, an image analyzing unit 140 may analyze an operation, where a motion vector of a third feature point P3 is converted in the direction of facing an image obtaining means or being distant from the image obtaining means, as a tapping operation and may perform a command mapped to the operation. For example, in case of the tapping operation, the image analyzing unit 140 may perform a command corresponding to a click of a mouse.

There may be no change in a length of each of a first length component L1 and a second length component L2 during a time interval from FIG. 7A to FIG. 7B, and an angle θ1 between the first length component L1 and the second length component L2 may decrease. The angle θ1 may further decrease during a time interval from FIG. 7B to FIG. 7C, and the first length component L1 may decrease in length.

An operation shown in FIGS. 7A to 7C may be analyzed as a holding operation, and such an operation may be analyzed as a command to perform an operation of selecting a specific object, that is, pushing a mouse long. If a feature point is moved in a state where the holding operation is performed, an operation of pulling a specific object may be performed.

If the angle θ1 increases again, the image analyzing unit 140 may analyze the holding operation as being released.

As described above, the 3D image analysis device and the 3D image analysis method according to an embodiment of the present disclosure may determine a feature point through image processing of a hand shape and may view a change in a 2D length component configured with feature points during a predetermined time interval. The 3D image analysis device and the 3D image analysis method may analyze a change in a coordinate of a 3D depth direction by viewing the change in the 2D length component and may derive a motion vector of feature points during a predetermined time interval based on such an analysis.

The 3D image analysis device and the 3D image analysis method according to an embodiment of the present disclosure may determine 3D depth information for an image obtained by a single camera. In addition, the 3D image analysis device and the 3D image analysis method according to an embodiment of the present disclosure may be useful for an interface of virtual reality (VR) and augmented reality (AR) by providing various interfaces through a hand shape based on the determination of the 3D depth information.

In the present disclosure, a computer-readable storage medium storing a program for performing the above-mentioned 3D image analysis method may be included in the spirit and scope of the present disclosure.

A system according to various embodiments may include at least one or more of the above-mentioned elements, or a part of the above elements may be omitted, or additional other elements may be further included. Embodiments disclosed in present disclosure are provided for describing and understanding disclosed technical details and are not intended to be limited to the scope of the present disclosure. Therefore, it should be interpreted that the scope of the present disclosure includes all modifications or various other embodiments based on the spirit and scope of the present disclosure.

The invention claimed is:

1. A method for analyzing a three-dimensional (3D) information of an image using a single camera, the method comprising:
    storing an image obtained by the single camera on a frame-by-frame basis;
    determining a plurality of feature points configuring a hand shape included in the stored image and extracting a region of interest (ROI) based on the feature points;
    tracking a change in a two-dimensional (2D) length component configured with feature points of the ROI during a predetermined time interval; and
    analyzing a change in 3D coordinates of the feature points based on the change in the 2D length component and deriving a motion vector of the feature points during the predetermined time interval based on the analysis,
    wherein the tracking of the change in the 2D length component comprises:
    tracking a change in two length components configured with finger feature points and a palm feature point,
    wherein the deriving of the motion vector comprises:
    estimating a change in a coordinate of a depth direction (z-axis) for the finger feature points based on a change in at least one of the two length components; and
    analyzing a change in the 3D coordinates for the feature points based on at least one of the estimated change in the coordinate of the depth direction, a change in an angle, and movement of a location and deriving the motion vector therefrom.

2. The method of claim 1, wherein the extracting of the ROI comprises:
    determining the finger feature points of ends of two adjacent fingers of the hand shape and the palm feature point of a palm boundary between the two fingers;
    setting a virtual feature point configuring a quadrangular region with the finger feature points; and
    extracting the quadrangular region configured with the virtual feature point and the finger feature points as the ROI.

3. The method of claim 2, wherein the tracking of the change in the 2D length component comprises:
    completing a hand shape skeleton corresponding to the 2D length component based on a skeleton model; and
    when at least one of the two length components is not defined in an image of a specified frame unit, defining the 2D length component based on the completed hand shape skeleton.

4. The method of claim 3, wherein the tracking of the change in the 2D length component further comprises:
    tracking a change in an angle between the two length components or movement of a location of each of the two length components.

5. The method of claim 4, further comprising:
estimating a change in rotation around a central axis of the hand shape skeleton based on the change in the coordinate of the depth direction.

6. The method of claim 4, further comprising:
determining an operation indicated by the hand shape based on the derived motion vector.

7. The method of claim 6, further comprising:
deriving a command matched to the operation indicated by the hand shape and executing the derived command.

8. The method of claim 1, further comprising:
providing a guide for an initial input of the hand shape on a display.

9. The method of claim 1, further comprising:
displaying at least one of feature points of the hand shape and a movement path of the feature points on a display.

10. A non-transitory computer-readable storage medium storing a program for performing the method of claim 1.

11. An apparatus for analyzing a 3D information of an image using a single camera, the apparatus comprising at least one processor configured to:
store an image obtained by the single camera on a frame-by-frame basis;
determine a plurality of feature points configuring a hand shape included in the stored image and extract an ROI based on the feature points;
track a change in a 2D length component configured with feature points of the ROI during a predetermined time interval; and
analyze a change in 3D coordinates of the feature points based on the change in the 2D length component and derive a motion vector of the feature points during the predetermined time interval based on the analysis,
wherein the processor tracks a change in two length components configured with finger feature points and a palm feature point,
wherein the processor estimates a change in a coordinate of a depth direction (z-axis) for the finger feature points based on a change in at least one of the two length components, analyzes a change in the 3D coordinates for the feature points based on at least one of the estimated change in the coordinate of the depth direction, a change in an angle, and movement of a location, and derives the motion vector therefrom.

12. The apparatus of claim 11, wherein the processor determines the finger feature points of ends of two adjacent fingers of the hand shape and the palm feature point of a palm boundary between the two fingers and extracts the ROI of a quadrangular region configured with the feature points.

13. The apparatus of claim 12, wherein the processor provides a hand shape guide for an initial input of a user on a display.

14. The apparatus of claim 12, wherein processor completes a hand shape skeleton corresponding to the two length components configured with the finger feature points and the palm feature point, based on a skeleton model and tracks a change in the two length components based on the completed hand shape skeleton.

15. The apparatus of claim 14, wherein, when at least one of the two length components is not defined in an image of a frame unit at a specific time, the processor estimates the 2D length component based on the hand shape skeleton.

16. The apparatus of claim 14, wherein the processor tracks a change in an angle between the two length components or movement of a location of each of the two length components.

17. The apparatus of claim 12, wherein the processor determines an operation indicated by the hand shape based on the derived motion vector.

* * * * *